United States Patent Office 3,575,946
Patented Apr. 20, 1971

3,575,946
METHOD OF PREPARING SOLUBLE POLYMERS OF ETHYLENE GLYCOL
Richard Chromecek, Miloslav Bohdanecky, Karel Kliment, Jaroslava Otoupalova, Vladimir Stoy, Miroslav Stol, and Zdenek Tuzar, Prague, Czechoslovakia, assignors to Ceskoslovenska akademie ved, Prague, Czechoslovakia
No Drawing. Filed May 17, 1967, Ser. No. 639,021
Claims priority, application Czechoslovakia,
May 24, 1966, 3,489/66
Int. Cl. C08f 15/26
U.S. Cl. 260—86.1                          8 Claims

ABSTRACT OF THE DISCLOSURE

Ethylene glycol monomethacrylate and monoacrylate contaminated with up to 50% of the corresponding bis-methacrylates or bisacrylates may be fully polymerized to solvent-soluble polymers in all solvent media capable of strongly swelling the cross-linked copolymer which would be formed if the same monomer mixture were polymerized in the absence of solvent.

BACKGROUND OF THE INVENTION

This invention relates to acrylic resins, and particularly to polymers of ethylene glycol acrylate and ethylene glycol methacrylate and of the corresponding esters of diethylene glycol and other polyethylene glycols which are soluble in many common solvents.

Polymers of ethylene glycol monoacrylate and monomethacrylate which are cross-linked by the corresponding diesters (ethylene glycol bis-acrylate and ethylene glycol bismethacrylate) were disclosed in Wichterle patent No. 2,976,576. Even less than 0.05% of the cross-linking agent is sufficient to make the polymer formed insoluble in all conventional solvents although it swells in contact with some solvents.

It is known that the monoesters of acrylic and methacrylic acid with ethylene glycol when free of the diesters can be polymerized in the presence of small amounts of conventional initiators in aqueous ethanol to form solvent soluble polymers. The polymers can be spun into fibers by extruding solutions from spinnerets into non-solvents and can be molded into structural shapes by the methods commonly applied to thermo-plastic synthetic resins. They also may be incorporated in lacquer formulations to replace other resins.

However, it is so difficult and costly to remove the diesters completely from the glycol monoesters of acrylic and methacrylic acid that the soluble polymers could not be prepared heretofore at reasonable cost. The diesters spontaneously form from the monoesters at elevated temperature, for example, during distillation.

The object of the invention is the provision of a practical and economical method of producing soluble polymers of the ethylene glycol esters of acrylic and methacrylic acid.

SUMMARY OF THE INVENTION

According to our invention, solvent soluble polymers are produced from monoesters of ethylene glycol contaminated with 0.05 to 50% of the corresponding diesters by holding the contaminated monoester under polymerization conditions in solution in a solvent medium having at the polymerization temperature an interaction parameter $\chi$ with respect to the soluble polymer of less than 0.5. Numerous examples of suitable solvents will be given hereinafter. A removal of the diesters prior to polymerization thus becomes unnecessary, and fully soluble polymers may be produced even if the conversion of the monomer to polymer is complete, that is, the degree of conversion is 100%.

The polymers formed under the conditions outlined above are soluble in the polymerization medium. They essentially consist of repeating groups of the formula

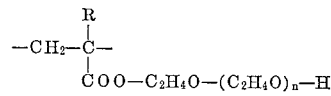

which are present in prevalent proportion, while the diester units are incorporated partly as branching units, partly in intramolecular cycles and as pendent groups of the formula

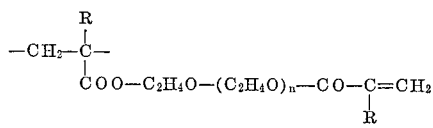

In these formulas, R is hydrogen in the acrylate polymers and methyl in the methacrylate polymers. The value of $n$ is zero in the polymers derived from esters of ethylene glycol. The value of $n$ is one in esters of diethylene glycol, and a higher integer in esters of other polyethylene glycols. The amount of pendent groups with double bonds generally increases with increasing diester concentration under equal polymerization conditions.

According to the composition of the monomer mixture employed, the amount of the groups derived from diester units is between 0.05% and 50%.

The value of the interaction parameter $\chi$ can be calculated either from the value of the second virial coefficient from the osmometric or light scattering method or from the phase equilibria method. All these methods are well known to those skilled in the art and described e.g. in the known textbook P. J. Flory, Principles of Polymer Chemistry, Chapter XII–XIII (Cornell University Press, Ithaca, N.Y., 1953). The value of the interaction parameter $\chi$ depends also on the temperature so that some solvents such as water-free ethanol may be suitable only at elevated temperature but unsuitable at room temperature.

Solvents which have been found suitable for the method of the invention include dimethylformamide, formamide, pyridine, dimethylsulfoxide, methanol, hot ethanol, tert-butanol, diethylene glycol, 2-methoxyethanol, benzyl alcohol, formic acid, acetic acid, tetrahydrofurfuryl alcohol, triethyleneglycol, allyl alcohol, cyclohexanol, ethyleneglycol, tetrafluoropropanol, and many mixtures including solvents not useful when employed singly, such as ethanol/water, n-propanol/water, tetrahydrofuran/water, dioxane/water, and concentrated aqueous solutions of salts capable of dissolving polymers, such as zinc chloride. Naturally, water can be added also to any above mentioned polar solvent, if desired. The solvents can be also mixed together, e.g. methanol with ethanol and similar.

The solvent listed above differ in their ability to prevent cross-linking in the presence of very large amounts of diesters so that, under some conditions, a minor amount of an insoluble gel may be formed together with the major quantity of soluble polymer.

Liquids which are poor solvents or non-solvents for the soluble polymer cannot be used successfully as solvent media in our method. Such liquids include benzene, paraffin oil, ethyl acetate, acetone, chloroform and anhydrous dioxane. The reaction product is either an opaque, macroporous cross-linked polymer or a transparent or translucent, cross-linked gel.

The influence of some typical suitable and unsuitable solvent media on the polymerization of ethylene glycol monomethacrylate contaminated with 0.4% ethylene glycol bis-methacrylate when performed at 100° C. for 8 hours in the presence of 1% dibenzoyl peroxide (based on the monomer weight) is evident from Table 1. In the table, $C_{gel}$ is the maximum concentration of solvent in the mixture of solvent and monomer at which a transparent gel is formed. $C_{MP}$ is the minimum concentration of solvent at which a spongy, macroporous polymer is formed. $C_{sol}$ is the minimum concentration of solvent at which a soluble polymer is obtained. The solvents are listed in the table in the order of their decreasing ability of dissolving the polymers prepared by the method of the invention.

TABLE 1

| Solvent | $C_{gel}$ | $C_{MP}$ | $C_{sol}$ |
| --- | --- | --- | --- |
| Dimethylformamide | 50 | | 60 |
| Formamide | 60 | | 70 |
| Cyclohexanol | 70 | | 80 |
| Ethanol | 60 | | 70 |
| Ethylene glycol | 80 | | 90 |
| Glycerol | 80 | 90 | |
| Water | 40 | 50 | |
| Toluene | 15 | 25 | |
| Benzene | 15 | 25 | |

The properties of the soluble polymers prepared by the method of this invention are related in a known manner to their average molecular weight, distribution of molecular weight, degree of branching, and the like which can be controlled by varying the conditions of polymerization, the effect of such conditions being partly illustrated hereinafter, and largely predictable from common knowledge in this art.

Process variables which affect the properties of the polymer include the ratio of solvent to total polymerization mixture, concentration of the contaminating diester in the mixture, characteristics of the solvent medium, type of initiator or catalyst employed (free radical, radiant energy, more particularly ultraviolet light, thermal energy) concentration of the initiator or catalyst, degree of conversion, temperature, presence of trace amounts of catalytically active metals such as iron or copper, agitation, presence of traces of oxygen or other polymerization inhibitors, and like factors partly discussed in detail hereinafter and otherwise familiar to those skilled in the art.

The permissible concentration $c_k$ of diester in the monoester at which only soluble polymer is formed under given polymerization conditions has been found to be an approximate function of the monomer concentration in the polymerization mixture according to the empirical equation $$c_k = (100 - x) \frac{a}{x - a}$$

wherein $x$ is the monomer concentration and $a$ is a constant factor characteristic of each monomer-solvent system at otherwise constant polymerization conditions, such as temperature, method of initiation, etc.

When the value of $a$ has been found for one monomer concentration, $c_k$ can be calculated with fair accuracy for other concentrations from the above equation.

Because $c_k$ is not significantly affected by the polymer concentration in the solvent medium, it is generally most advantageous to add the monomer gradually to the solvent medium in the presence of an initiator at such a rate that the monomer concentration never approaches or exceeds the critical value in any part of the polymerization mixture.

The solubility in some polar solvents of the polymers prepared according to the invention can be enhanced by copolymerization with monomethacrylates or monoacrylates of diethylene glycol, triethylene glycol, or higher polyethylene glycols. The copolymers have a greater tendency to swell in water, and may be entirely water soluble.

With the best solvents and at low concentrations of monomer in the polymerization mixture, monomer mixtures containing 50% diester can be handled successfully by the method of the invention without cross-linking of the polymer formed. A mixture of equal weights of polyethylene glycol monomethacrylate and bismethacrylate can be polymerized to a fully soluble polymer without any gel formation in a polymerization medium of dimethylformamide in which the monomer concentration is held between 1 and 5%. The polymer, of course, has numerous olefinic side chains, but it is still quite stable at ordinary temperature and does not tend to form insoluble gels when kept free of polymerization catalysts.

The method of the invention permits the preparation of fully soluble polymers having average molecular weights ranging from several hundred to several millions, and having carbon chains which may be either predominantly linear or greatly branched. Other monomers present in the polymerization mixture, such as acrylonitrile, the lower alkyl methacrylates such as methyl and ethyl methacrylate, styrene, vinyl acetate and other monoolefinic monomers, if soluble in the polymerization mixture, form copolymers with the ethylene glycol esters.

The soluble, partly hydrophilic polymers which may be obtained by the method of the invention can be used as physiologically tolerated wound coverings, or as antistatic coatings. Moldings, rods, blocks, plates, foils, filaments are readily prepared by conventional methods from the polymers and copolymers of the invention. The solutions of the polymers in solvents, as directly obtained by the polymerization reaction, may be employed as such, or the polymeric resin recovered from the solvent may be extruded, molded, cast, calendered or otherwise shaped in a conventional manner to form structural elements. Carbon black, silica, mica, cellulose, synthetic fibers, and other fillers and pigments are compatible with the acrylic polymers of the invention.

DESCRIPTION OF PREFERRED EMBODIMENTS

The following examples are further illustrative of the present invention, and it will be understood that the invention is not limited thereto:

EXAMPLE 1

300 g. ethylene glycol monomethacrylate containing 1% ethylene glycol bismethacrylate were mixed with 900 g. dimethylformamide and 0.6 g. dibenzoyl peroxide, and the mixture was heated to 100° C. under a nitrogen blanket for eight hours. The solvent was then distilled off in a vacuum, and the residue was dissolved in 750 ml. methanol. When the methanol solution was poured into 4000 ml. water with stirring, a polymer was precipitated. It was separated from the aqueous medium, dried at 80° C. in a vacuum, and weighed 290 g.

The polymer was soluble in methanol, dimethylformamide, foramide, tert-butanol, dimethylsulfoxide, and ethylene glycol at room temperature, also in hot ethanol and n-propanol. Its average molecular weight was 230,000.

It could be further purified by reprecipitation from methanol by means of ether, ethyl acetate, or a 1:1 mixture of benzene and petroleum ether.

EXAMPLE 2

A solution of 30 g. ethylene glycol monomethacrylate containing 0.5% ethylene glycol bismethacrylate and 0.3 g. dibenzoyl peroxide in 120 g. methanol was heated for eight hours to 100° C. under nitrogen. The solution was then filtered, and the filtrate was poured with stirring into an excess of water. The precipitated raw polymer was dissolved in methanol and again precipitated with water. The yield of purified polymer was 12.8 g. The product was fully soluble in the solvents mentioned in Example 1.

The same result was obtained when the methanol used above as a polymerization medium was replaced by equal amounts of ethanol, tert-butanol, cyclohexanol, formamide, dimethylsulfoxide, and tetrafluoropropanol, and the polymer was recovered from the polymerization mixture as described in Example 1.

EXAMPLE 3

By way of comparison, 30 g. ethylene glycol monomethacrylate containing only 0.1% of the corresponding bis-methacrylate were polymerized in 120 g. ethyl acetate under conditions otherwise identical with those of Example 2. Although the amount of cross-linking diester present was very small, an insoluble product was obtained.

Similar insoluble and cross-linked polymers were obtained when other solvents for the monomer having interaction parameters $\chi$ greater than 0.5 and not capable of strongly swelling the cross-linked polymer were employed, such as water, dioxane, and benzene.

EXAMPLE 4

A solution of 5 g. ethylene glycol monomethacrylate containing 30% of the corresponding bis-methacrylate and 0.05 g. dibenzoyl peroxide in 95 g. dimethylformamide was held at 100° C. for eight hours. The polymer formed was recovered and purified as described in Example 1. It was soluble in the solvents for the polymer mentioned in that example.

EXAMPLE 5

A solution in 95 g. ethanol of 5 g. ethylene glycol monomethacrylate contaminated with 10% of the diester was heated in the presence of dibenzoyl peroxide as described in Example 4, and a soluble polymer was recovered as described there.

EXAMPLE 6

A solution of 5 ml. ethylene glycol monomethacrylate containing 0.1% of the diester in 35 ml. of a saturated aqueous solution of zinc chloride (d 1.97) containing 0.015 g. dibenzoyl peroxide was heated to 60–80° C. for 3 hours. The viscous solution was poured into a large excess of 0.1% hydrochloric acid. The precipitated polymer was well washed, dissolved in methanol, and reprecipitated with water.

It was fully soluble in the solvents referred to above.

EXAMPLE 7

A mixture of 250 ml. glycerol (commercial grade, containing about 10% of water), 25 ml. ethylene glycol monomethacrylate containing 0.2% of the diester, and 0.04 g. dibenzoyl peroxide was heated for 3 hours to 90° C. under carbon dioxide. The product obtained was heterogeneous and partly cross-linked. It was extracted with methanol at room temperature, and the extract was mixed with water. The polymer precipitated thereby was soluble in all solvents capable of swelling cross-linked polymers of ethylene glycol methacrylate.

EXAMPLE 8

A mixture of 15 ml. ethylene glycol monomethacrylate containing 0.2% of the diester and 0.20 ml. 40% aqueous ammonium persulfate solution was gradually added over a period of four hours to an agitated solution of 0.03 ml. dimethylaminoethyl acetate in 100 ml. glycerol at 60° C. After the addition was completed, the mixture was further heated for two hours. It was then viscous, and was poured into an excess of water. The glycerol employed was of a commercial grade and contained about 10% water.

The precipitate formed was soluble as that described in Example 7.

EXAMPLE 9

A solution prepared from 10 ml. ethylene glycol monomethacrylate containing 0.2% of the diester, 0.1 ml. 40% persulfate solution, 0.02 ml. dimethylaminoethyl acetate, and 30 ml. glacial acetic acid was heated at 65° C. for 5 hours under carbon dioxide, and was then stirred into an excess of water.

The white fibrous polymer precipitated thereby was soluble in dimethylformamide, methanol, and other solvents suitable for the product of Example 1. The conversion was nearly 100%.

EXAMPLE 10

A solution of 10 ml. ethylene glycol methacrylate containing 0.4% of the diester and 0.1 g. dibenzoylperoxide in 90 ml. of a mixture of equal volumes of water and n-propanol was heated to 100° C. for 8 hours. The solvent was then evaporated in a vacuum, the residue was dissolved in methanol, and the solution was poured into a 1:1 mixture of benzene and heptane to precipitate the polymer.

Similar soluble polymers are obtained under otherwise similar conditions when the propanol-water mixture is replaced by mixtures of 70% tetrahydrofuran with 30% water or 70% dioxane with 30% water. Only cross-linked insoluble gels were obtained even at low degrees of conversion when n-propanol, dioxane, or water were employed singly as polymerization media under otherwise the same conditions, and even when the polymerization was interrupted at a low degree of conversion.

EXAMPLE 11

Several solutions of 15 g. ethylene glycol monomethacrylate containing 0.5% of the corresponding diester in 60 ml. ethanol were heated to 100° C. for eight hours. One solution was exposed to ultraviolet radiation during heating, the others contained 0.15 g. respectively of azo-bis-isobutyronitrile, di-isopropyl percarbonate, tert-butyl hydroperoxide, di-tert-butyl peroxide, and p-cymene hydroperoxide.

Soluble polymers were produced in all solutions and were recovered as described above. The nature of the initiator or catalyst employed for the polymerization thus is not critical.

EXAMPLE 12

A mixture of 100 g. ethylene glycol monomethacrylate containing 0.81% of the diester, 400 g. ethyleneglycol monomethyl ether (2-methoxyethanol), and 1 g. dibenzoyl peroxide was heated under nitrogen to 100° C. for eight hours. A soluble polymer was formed and was recovered as in the preceding examples.

EXAMPLE 13

20 ml. of a technical grade of diethylene glycol monomethacrylate containing 97.75% of the monoester and 0.15% of diester were dissolved in 180 ml. ethanol and polymerized by heating to 100° C. in the presence of 0.02 g. dibenzoyl peroxide for five hours under nitrogen. The polymer obtained was fully soluble not only in ethanol but also in water.

A water soluble polymer was prepared in the same manner from triethyleneglycol monomethacrylate containing 0.2% of the corresponding diester. All copolymers of ethyleneglycol monomethacrylate or acrylate with diethyleneglycol monomethacrylate, triethyleneglycol monomethacrylate, or other polyethylene glycol acrylates and methacrylates are soluble in ethanol when prepared according to this invention from the mixed monomers in an obvious manner. When the combined content of diethyleneglycol and triethyleneglycol esters in the monomer mixture exceeds 50%, the copolymers are also soluble in water.

EXAMPLE 14

A solution of 30 g. ethylene glycol monomethacrylate containing 0.5% of the diester in 120 ml. ethanol was heated to 70° C. for 10 hours in the presence of 3 g. dibenzoyl peroxide and 1.5 ml. diethylaminoethyl acetate. The polymer recovered from the reaction mixture by the method of Example 2 was as soluble as that produced by the method of that example.

EXAMPLE 15

A solution of 10 g. ethylene glycol monoacrylate containing 0.24 g. ethylene glycol bisacrylate and 0.15 g.

dibenzoyl peroxide in 120 g. dimethylformamide was heated to 100° C. for eight hours under nitrogen.

The polymer formed was recovered as described above. It was fully soluble in the solvents for the polymer of Example 1.

EXAMPLE 16

Solutions of ethylene glycol monomethacrylate and ethylene glycol bismethacrylate in dimethylformamide containing 1% dibenzoyl peroxide (based on the monomer present) were heated to 100° C. for 8 hours under a nitrogen blanket whereby 100% conversion was achieved.

The several solutions differed in the ratio of monoester and diester in the monomer mixture, and in the ratio of monomer and solvent. These variations affected the average molecular weight of the polymer obtained and the degree of branching of the monomer chains as is shown in Table 2. All polymers, however, were soluble in the solvents referred to in Example 1.

In the table, $M_w$ is the average molecular weight as determined by measuring light scattering. The listed ratio of the intrinsic viscosity of a tested polymer to that of a known entirely linear polymer of the same molecular weight $$\left(\frac{[\eta]v}{[\eta]l}\right)_M$$

is a measure of chain branching, the value of the ratio being approximately inversely proportional to the degree of branching.

TABLE 2

| Diester, percent in monomer | Monomer, percent in solvent | $M_w \times 10^{-3}$ | $\left(\frac{[\eta]v}{[\eta]l}\right)_M$ |
|---|---|---|---|
| 1 | 5 | 65 | 0.86 |
| 10 | 5 | 140 | 0.55 |
| 20 | 5 | 160 | 0.35 |
| 30 | 5 | 3,000 | 0.075 |
| 40 | 5 | 10,000 | 0.020 |
| 50 | 5 | 14,000 | 0.030 |
| 1 | 10 | 42 | 0.95 |
| 5 | 10 | 140 | 0.52 |
| 1 | 15 | 54 | 0.86 |
| 1 | 20 | 81 | 0.80 |

A series of similar polymerization runs were performed with ethanol as a solvent instead of the dimethylformamide. The results obtained are listed in Table 3 in the same manner as in Table 2 above.

TABLE 3

| Diester, percent in monomer | Monomer, percent in solvent | $M_w \times 10^{-3}$ | $\left(\frac{[\eta]v}{[\eta]l}\right)_M$ |
|---|---|---|---|
| 5 | 5 | 170 | 0.33 |
| 5 | 15 | 200 | 0.30 |
| 1 | 10 | 280 | 0.23 |
| 5 | 10 | 360 | 0.28 |
| 1 | 20 | 2,000 | 0.20 |

Tables 2 and 3 show that the average molecular weight can be controlled at uniform initiator concentration and polymerization temperature by the concentration of the monomer in the solvent medium and by suitably choosing the solvent. The influence of the diester present on the properties of the soluble polymer produced also are evident. The influence of initiator concentration and polymerization temperature on the molecular weight of the product is well understood and does not require illustration.

EXAMPLE 17

A cross linked polymer was prepared in the form of a 1 mm. thick foil from ethylene glycol monomethacrylate containing 0.4% of the corresponding diester, adding 0.2% diisopropyl percarbonate and heating under nitrogen to 70° C. for 30 minutes. Specimens of the polymer were exposed at 25° C. to the solvents which are listed in Table 4 together with the corresponding coefficients of swelling. The term "coefficient of swelling" is the ratio of the volume of the gel after reaching equilibrium with the solvent to the volume of the original polymer. The coefficient is practically independent of minor variations in the preparation of the cross-linked material. The method was extensively described by O. Wichterle and R. Chromeček, I.U.P.A.C. Symposium of Macromolecular Chemistry, Prague 1965, Preprint No. 620.

TABLE 4

| Solvent | Coeff. of swelling |
|---|---|
| Dimethylformamide | 6.15 |
| Dimethylsulfoxide | 5.85 |
| Pyridine | 5.50 |
| Formic acid | 5.18 |
| 2-methoxyethanol | 4.95 |
| Tetrahydrofurfuryl alcohol | 4.91 |
| Diethylene glycol | 4.52 |
| tert-Butanol | 4.36 |
| Triethylene glycol | 4.18 |
| Formamide | 4.03 |
| Ethylene glycol | 3.80 |
| 2-ethoxyethanol | 3.74 |
| Allyl alcohol | 3.79 |
| Methanol | 3.04 |
| Ethanol | 2.22 |
| n-Propanol | 1.99 |
| Water | 1.68 |
| Tetrahydrofuran | 1.65 |
| Acetone | 1.58 |
| Methylethyl ketone | 1.37 |
| Chloroform | 1.29 |
| Cyclohexanone | 1.20 |
| Toluene | 1.16 |
| Glycerol | 1.14 |

As is evident from the preceding examples, and was comfirmed by further tests, solvents and solvent mixtures having a swelling coefficient greater than about 2 can be used successfully in the method of the invention as polymerization media for preparing soluble glycol methacrylate polymers from monomers containing more than 0.05% of the diester and for preparing the corresponding polyacrylates. Solvents having swelling coefficients smaller than 2 cause the partial formation of insoluble polymers even under the conditions most favorable to the preparation of soluble polymers. The solvents having the highest swelling coefficients permit soluble polymers to be formed even under unfavorable conditions, such as the presence of relatively large amounts of the diester, up to 50%, in the monomer mixture, and at relatively high monomer concentrations.

When the solvents of the invention are employed, the polymer formed is soluble even at a very high degree of conversion, including values between 90 and 100%, without simultaneous formation of insoluble gels. In the presence of solvents having at polymerization temperature the interaction parameter $\chi$ higher than 0.5 and lacking the required coefficient of swelling or in the absence of all solvents, soluble polymers can be produced only if the concentration of the diester in the monomer mixture does not exceed 0.2%, and even then only if the degree of conversion is held to a low value, typically less than 5%.

The method of the invention thus permits the conversion of crude mixtures of ethylene glycol esters of acrylic or methacrylic esters into soluble polymers without purification. The raw commercial product normally contains between 0.1 and 10% of the diester. It may further contain minor amounts of ethylene glycol and water remaining from a previous esterification reaction. None of these contaminants interfere with the polymerization according to this invention, and they need not be removed, the

We claim:
1. A method of preparing a hydrophilic polymer, said polymer being readily soluble in methanol and being of a molecular weight of at least 40,000, comprising polymerizing a monomeric mixture consisting essentially of at least 50% by weight of the said mixture of ethyleneglycol, diethyleneglycol or triethyleneglycol monoester of acrylic or methacrylic acid and at least 0.05% by weight of the said mixture of a diester of ethyleneglycol or diethyleneglycol diacrylate or dimethacrylate under conditions of free radical polymerization in solution in a solvent medium having an interaction parameter with respect to the soluble polymer of less than 0.5.

2. A method as set forth in claim 1, wherein said continuing monoester is gradually added to said medium while said medium is being held under said polymerization conditions.

3. A method as set forth in claim 1, wherein said solvent medium is a member selected from the group consisting of dimethylformamide, dimethylsulfoxide, pyridine, formic acid, acetic acid, 2-methoxyethanol, tetrahydrofurfuryl alcohol, diethylene glycol, tert-butanol, triethylene glycol, formamide, allyl alcohol, methanol, ethanol, cyclohexanol, benzyl alcohol, ethylene glycol, tetrafluoropropanol, mixtures thereof with each other and with water, and aqueous solutions of n-propanol, tetrahydrofuran, dioxane, and zinc chloride.

4. A method as set forth in claim 1, wherein said monoester is ethylene glycol monomethacrylate.

5. A method as set forth in claim 1 wherein the said diester is .4% by weight.

6. A method as set forth in claim 1 wherein the polymerization is conducted at a temperature higher than 50° C.

7. A hydrophilic polymer readily soluble in methanol consisting essentially of at least 50% of first repeating groups of the formula

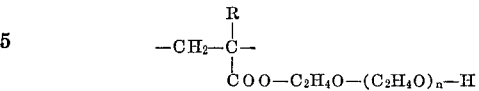

and a minor portion of second repeating groups of the formula

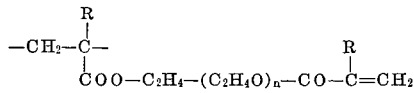

R in said formulas being hydrogen or methyl and $n$ being an integer not greater than 2, said polymer being uncross-linked and the amount of said second groups of at least 0.05% by weight of the combined amount of said first and second groups, said polymer being of at least a molecular weight of 40,000.

8. A polymer as set forth in claim 7, wherein $n$ is zero.

References Cited
UNITED STATES PATENTS

| | | | |
|---|---|---|---|
| 3,400,103 | 9/1968 | Samour et al. | 260—86.1E |
| 2,946,776 | 7/1960 | Scott et al. | 260—89.5 |
| 3,218,305 | 11/1965 | Krieble | 260—86.1 |

HARRY WONG, JR., Primary Examiner

U.S. Cl. X.R.

204—159.22; 260—29.6, 30.2, 30.4, 30.8, 31.2, 32.6, 33.4, 41, 80.6, 80.81